United States Patent [19]
Hoang

[11] Patent Number: 5,761,657
[45] Date of Patent: Jun. 2, 1998

[54] GLOBAL OPTIMIZATION OF CORRELATED SUBQUERIES AND EXISTS PREDICATES

[75] Inventor: Chi Kim Hoang, Inglewood, Calif.

[73] Assignee: NCR Corporation, Dayton, Ohio

[21] Appl. No.: 577,681

[22] Filed: Dec. 21, 1995

[51] Int. Cl.⁶ .................................................... G06F 7/00
[52] U.S. Cl. .................................................. 707/4; 707/2
[58] Field of Search ................................... 395/602, 603, 395/604, 605, 611, 614; 707/2, 3, 4, 5, 101, 104; 1/1

[56] References Cited

U.S. PATENT DOCUMENTS

| | | | |
|---|---|---|---|
| 5,301,317 | 4/1994 | Lohman et al. | 395/600 |
| 5,303,383 | 4/1994 | Neches et al. | 395/500 |
| 5,345,585 | 9/1994 | Iyer et al. | 395/600 |
| 5,367,675 | 11/1994 | Cheng et al. | 395/600 |
| 5,412,804 | 5/1995 | Krishna | 395/600 |
| 5,423,035 | 6/1995 | DePrez | 395/600 |
| 5,469,568 | 11/1995 | Schiefer et al. | 395/600 |
| 5,546,576 | 8/1996 | Cochrane et al. | 395/600 |
| 5,548,754 | 8/1996 | Pirahesh et al. | 395/600 |
| 5,548,755 | 8/1996 | Leung et al. | 395/600 |
| 5,548,758 | 8/1996 | Pirahesh et al. | 395/600 |
| 5,557,791 | 9/1996 | Cheng et al. | 395/600 |
| 5,619,692 | 4/1997 | Malkemus et al. | 395/602 |
| 5,659,725 | 8/1997 | Levy et al. | 395/600 |
| 5,671,403 | 9/1997 | Shekita et al. | 395/603 |

OTHER PUBLICATIONS

A. Swami, "Distributions of Query Plan Costs for Large Join Queries" IBM 1991; pp. 1–17.

Ioanndies et al., "Randomized Algorithms for Optimizing Large Join Queries", Proceedings of the 1990 ACM SIGMOD Int. Conf. on Mangagment of Data, May 1990, pp. 312–321.

A. Swami et al. "Optimization of Large Join Queries", Ass. for Computing Machinery Special Interest Group on Managment of Data, 1988 Annual Conference, pp. 8–17.

Boral et al., "Optimization of Nonrecursive Queries", Twelth International Conference on Very Large Databases, Aug. 1996, pp. 128–137.

Ibaraki et al., "On the Optimal Nesting Order for Computing N–Relational Joins", ACM Transactions on Databases Systems, vol. 9, No. 3, Sep. 1984, pp. 482–502.

Kim, "On Optimizing an SQL-like Nested Query", ACM Transaction on Databases Systems, vol. 7, No. 3, Sep. 1982, pp. 443–469.

Astrahan et al., "Access Path Selection in a Relational Database Management System" IBM Technical Disclosure Bulletin, vol. 22, No. 4, Sep. 1979, pp. 1657–1660.

Lee et al. "Implicit Joins in the Structural Data Model", IEEE, 1991, pp. 357–364.

Soo et al. "Efficient Evaluation of the Valid-Time Natural Join", IEEE, 1994, pp. 282–292.

Deshpande et al. "The Design and Implementation of a Parallel Join Algorithm for Nested Relations on Shared Memory Multiprocessors", IEEE, 1992, pp. 68–77.

Ramakrishnan et al. "Rule Ordering in Bottom–Up Fixpoint Evaluation of Logic Programs", IEEE, 1994, pp. 501–517.

Hanson "The Design and Implementation of the Ariel Active Database Rule System", IEEE Transactions on Knowledge and Data Engineering, vol. 8, No. 1, Feb. 1996, pp. 157–172.

*The YNET: An Interconnect Structure for a Highly Concurrent Data Base Computer System*, Dr. Philip M. Neches, 1988, Teradata Corp.

*DB2 Concepts, Programming, and Design*, Ranade et al., 1991, McGraw-Hill, Inc., ch. 9–10.

*Primary Examiner*—Thomas G. Black
*Assistant Examiner*—Michael J. Wallace, Jr.
*Attorney, Agent, or Firm*—Merchant, Gould, Smith, Edell, Welter & Schmidt

[57] ABSTRACT

A method of optimizing a query and its subqueries together in a global manner regardless of the nesting levels. All joins in different nesting levels are effectively converted into joins in the same level by assigning a nesting level attribute to relations, assigning properties to the predicate, and assigning nesting level attributes and minimum relation set attributes to join predicate operands. The joins and their predicates are then considered as if they were contained in only the main query according to a set of rules based on the attributes of the relations and the join predicates.

18 Claims, 6 Drawing Sheets

RULES TO SELECT RELATIONS AND PREDICATES

| | | |
|---|---|---|
| 1. | A RELATION WHOSE LABEL SET IS THE SAME AS ANOTHER RELATION CAN BE JOINED TO THAT RELATION. | 602 |
| 2. | DURING A JOIN, USE THE OUTER RELATION LABEL IF A CONNECTING PREDICATE IS USED; OTHERWISE, USE THE INNER RELATION LABEL. | 604 |
| 3. | FOR TWO JOIN CANDIDATES, CHOOSE A PREDICATE IF THE RIGHT OPERAND LABEL IS A SUBSET OF THE BIGGER SET. | 606 |
| 4. | PERFORM THE STEPS SHOWN IN FIG. 5. | 608 |
| 5. | TERMINATE THE PROCESS WHEN THERE IS ONE RELATION LEFT. | 610 |

GLOBAL OPTIMIZATION OF CORRELATED SUBQUERIES AND EXISTS PREDICATES

BACKGROUND OF THE INVENTION

1. Field of the Invention

This invention relates in general to computerized relational databases, and in particular, to a method, apparatus and program product for performing global optimization for joins in queries having subqueries.

2. Description of Related Art

Relational databases are a powerful way to represent a wide variety of information which is stored and processed by digital computers. Relational databases store information in a row and column format. A value stored at a particular column and row location within the database is related to all other values within the same column and row. A collection of values which are stored in columns and rows is known as a relation. Additional columns and rows may be added, deleted, changed, or searched, through a variety of logical operations which may be performed on the relational database. Typical queries of the relational database combine logical operators in order to retrieve specific information from the relational database by column or row. The logical operations which may be performed on a relational database are typically combined into a query language in order to provide a more intuitive and easier user interface for programmers and users of relational databases. A well-known industry standard query language used throughout academic and commercial applications is known as Structured Query Language (SQL). The format, structure and use of SQL queries is well-known and may be found in numerous standard references, one of which is Ranade et al., *DB2 Concepts, Programming, and Design*, 1991, McGraw-Hill, Inc., ch. 9–10, which is herein incorporated by reference.

Traditionally, a query is optimized one query block at a time. A query may itself contain additional nested queries which are known as subqueries. Each subquery is executed and its result is usually saved into a temporary relation. A reference made to a subquery is then replaced by a reference to its temporary relation.

There are at least two ways to handle a correlated subquery in a local optimization approach. A first method of processing subqueries involves carrying out a subquery without considering the outer relations and saving the result in a temporary relation. A join between this temporary relation and each outer row will return the rows of the correlated subquery. In this case, if only a small subset of the temporary relation should be returned for each outer row, the unused portion is wasted. If for each outer row the subquery is evaluated without the use of the temporary relation, even more processing is wasted because the join between the tables contained in the subquery must be repeated.

A second method of processing subqueries is required for the local optimization method if the subquery itself has a nested correlated subquery. The second method involves reevaluating the subquery in the main query and its subqueries for each outer row. The deeper the nesting level of the query, the grater amount of processing is wasted.

Therefore, there is a need for an efficient method of optimizing a query and its subqueries together in a global manner regardless of the nesting levels.

SUMMARY OF THE INVENTION

To overcome the limitations in the prior art described above, and to overcome other limitations that will become apparent upon reading and understanding the present specification, the present invention discloses a method, apparatus and program product for optimizing an SQL query and its subqueries together in a global manner, regardless of the nesting levels in the query. All joins in different nesting levels are effectively converted into joins in the same level by assigning nesting level attributes to relations, assigning properties to predicates, and assigning nesting level attributes and minimum relation set attributes to join predicate operands. The joins and their predicates are then considered as if they were contained in only the main query according to a set of rules based on the attributes of the relations and the join predicates.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The method of the present invention optimizes an SQL query and its subqueries together in a global manner regardless of the nesting levels. All joins in different nesting levels are effectively converted into joins in the same level by assigning nesting level attributes to relations, assigning properties to predicates, and assigning nesting level attributes and minimum relation set attributes to join predicate operands. The joins and their predicates are then considered as if they were contained in only the main query according to a set of rules based on the attributes of the relations and the join predicates.

Effectively, if a predicate in an enclosing query selects only a subset of a relation which is also referenced in its subquery, it is utilized inside the subquery to reduce the temporary relation size. This reduces the number of processed rows and accelerates query processing.

ENVIRONMENT

Figure 1:
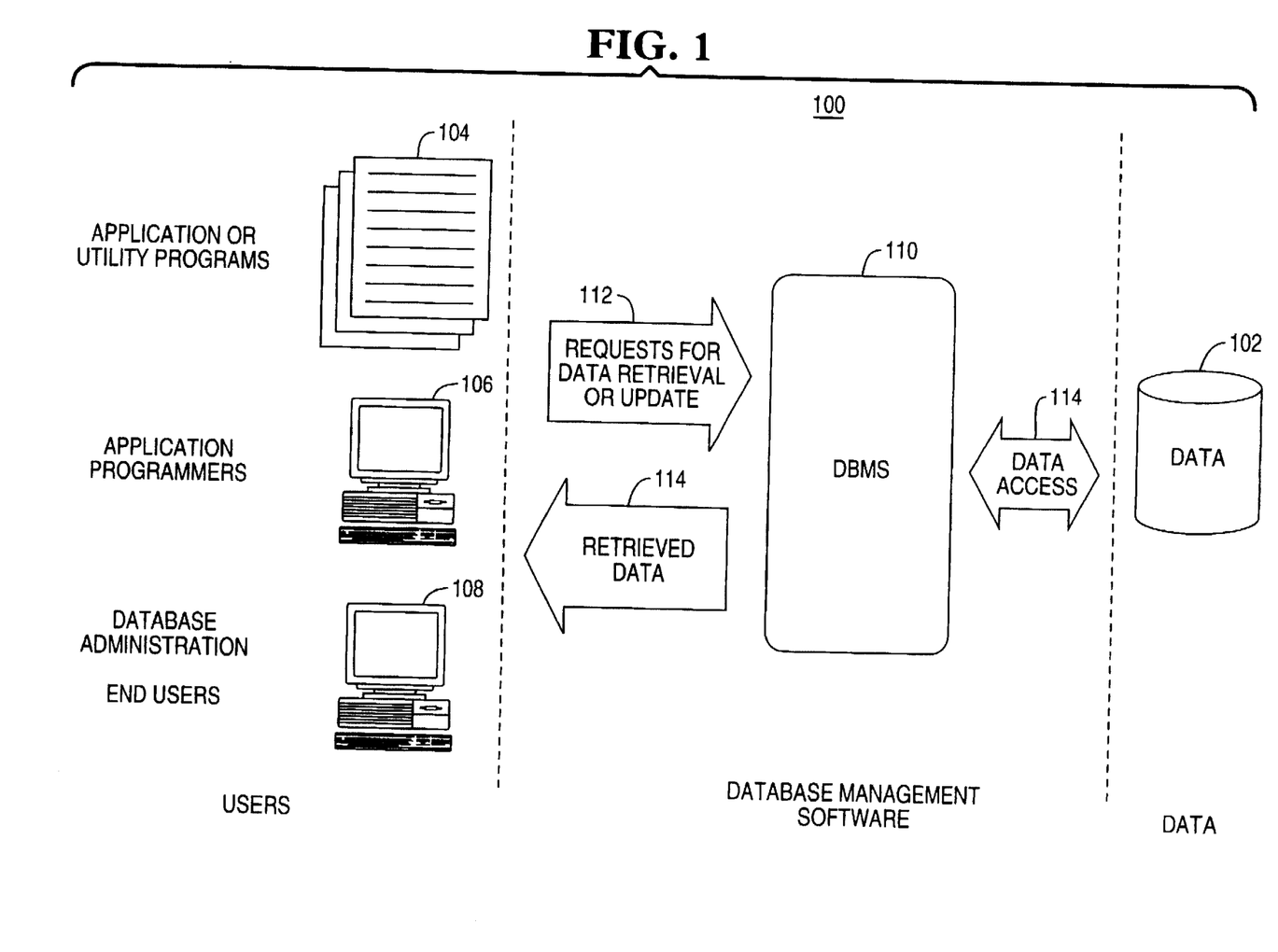
FIG. 1 is a system diagram of the components of an information retrieval system including a relational database management system (RDBMS)

FIG. 1 illustrates an exemplary environment that could be used with the present invention. In the exemplary environment, the present invention is a computer-implemented relational database management system (RDBMS) software. The computer system 100 is typically comprised of one or more processors coupled to one or more fixed and/or removable electronic data storage units (DSUs) 102, such as disk drives, that store one or more relational databases, along with other data and programs. The computer system 100 is connected to client systems, such as application or utility programs 104 and workstations 106 and 108 for application programmers, database administrators, and end users.

The computer system 100 executes RDBMS software 110 that acts as an interface between users and a relational database stored on the DSUs 102. Operators of the computer system 100 use a terminal or workstation to transmit electrical signals to and from the computer system 100 that represent commands 112 for performing various search and retrieval functions, termed queries, and various data update functions. The RDBMS 110 then performs the desired data access 114 against the relational database, and data retrieved from the relational database is returned 114 to the users 102, 104, 106.

In the preferred embodiment of the present invention, the queries conform to the Structured Query Language (SQL) standard and the RDBMS software 110 comprises the Teradata® product offered by AT&T Global Information Solutions™. Those skilled in the art will recognize, however, that the present invention has application to any RDBMS software 110 that uses SQL. The RDBMS software 110 performs the functions necessary to implement the RDBMS functions and SQL standards, i.e., definition, compilation, interpretation, optimization, database access control, database retrieval, and database update.

The present invention is typically embodied in one or more components of the RDBMS software 110 executed or performed by the computer system 100. The RDBMS software 110 itself is tangibly embodied in a computer readable medium, such as portable or fixed DSUs 102, and includes instructions, which when executed by the computer system 100, causes the computer system 100 to perform the steps necessary to implement the steps and elements of the present invention described below.

EXECUTION OF SQL QUERIES

Figure 2:
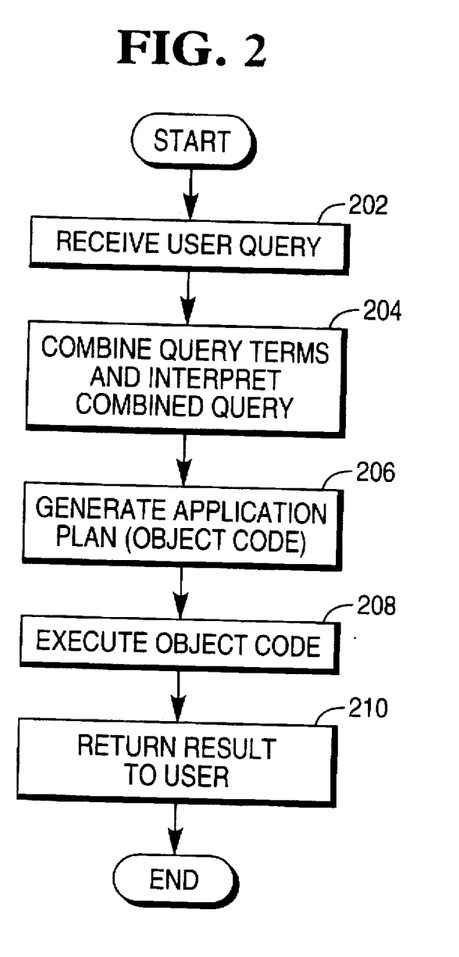
FIG. 2 is a flow diagram which shows a method of user interaction with a RDBMS.

FIG. 2 is a flow chart illustrating the steps necessary for the interpretation and execution of SQL statements, either in source code or in a batch environment or in an interactive environment, according to the present invention. At 202, the RDBMS software 110 receives an SQL query comprising, for example, a query against the relational database. At 204, the RDBMS software 110 combines multiple user query terms, if any, and subsequently attempts to interpret the combined query. At 206, an application plan is generated which enables the RDBMS software 110 to retrieve the correct information from the relational database. Typically, the application plan is compiled into object code for more efficient execution by the RDBMS software 110, although it could be interpreted rather than compiled. At 208, the RDBMS software 110 executes the generated object code, retrieves the result from the database, and then returns the result to the user or user application at 210.

SELECT STATEMENT

One of the most common SQL queries executed by the RDBMS software 110 is the SELECT statement. In the SQL standard, the SELECT statement generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required. The result of a SELECT statement is a subset of data retrieved by the RDBMS software 110 from one or more existing tables stored in the relational database, wherein the FROM clause identifies the name of the table from which data is being selected. The subset of data is treated as a new table, termed the result table, which typically comprises a temporary table. In general, the items specified in the SELECT clause of the SELECT statement determine the columns that will be returned in the result table from the table(s) identified in the FROM clause.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

JOIN OPERATION

A join operation is usually implied by naming more than one table in the FROM clause of a SELECT statement. A join operation makes it possible to combine tables by combining rows from one table to another table. The rows, or portions of rows, from the different tables are concatenated horizontally. Although not required, join operations normally include a WHERE clause that identifies the columns through which the rows can be combined. The WHERE clause may also include a predicate comprising one or more conditional operators that are used to select the rows to be joined.

RELATIONS

A relation is a table contained within a query. In this sense, the term relation is used interchangeably with the term table; it may also be used to refer to the result of a join. In the present specification, when a table is used in a query where it is also mentioned in a FROM clause, it is immediately contained in the query. When the same table is then used in subqueries, it is referenced to. With this convention, an instance of any table is immediately contained only in one query, and it may be referenced in many subqueries.

Each relation has a table list to indicate which base table(s) is included. For a base table, its table list has itself as the only member. For a join result, the table list contains all tables included in the left and the right join operands.

QUERY BLOCKS, INNER TABLES AND OUTER TABLES

A query may have one or more query blocks. A simple query has only one query block, such as:

```
SELECT X1
FROM T1
```
or:
```
SELECT X1, Y2
FROM T1, T2
WHERE T1.Y1 = T2.X2
```

A more complex query has two or more query blocks, such as:

```
SELECT X1
    FROM T1
    WHERE X1 NOT IN (SELECT Y2 FROM T2)
```

There is always an enclosing query block, the main or outermost query block, which represents the whole query, and there are zero or more enclosed query blocks, which represent subqueries inside the main query. An enclosed query block may also have its own enclosed query blocks. Nesting levels for query blocks are only limited by system resources used for query processing. When the nesting level is greater than two, the innermost query has more than one enclosing query, which is its immediate enclosing query, and the enclosing query of its immediate enclosing query. If a table is immediately contained inside a query block, it is considered to be an inner table; otherwise, it is an outer table. A table can be inner in only one block and outer in one or more subblocks.

Queries and their subqueries are connected by any of three types of predicates: (1) connecting, (2) correlating, and (3) existential. For purposes of illustration, all examples in the present specification use the SELECT operations. However, it will be recognized by those of skill in the art that the method of the present invention also applies for INSERT, UPDATE and DELETE operations.

CONNECTING PREDICATES

A connecting predicate may contain a comparison operator or a comparison operator followed by the ANY or ALL quantifier. Comparison operators are $<, >, =, \leq, \geq,$ and $<>$, which represents less than, greater than, equal, less than or equal, greater than or equal, and not equal, correspondingly. Comparison operators compare two values of the same type, which can be numeric or alphanumeric string.

A subquery following a comparison operator must return a single row. If a comparison operator is followed by the quantifier ANY or ALL, the predicate is a quantified predicate. A subquery following a quantified predicate can return multiple rows.

The following are examples of queries related via a connecting predicate:

```
SELECT X1
    FROM T1
    WHERE T1.Y1 = ANY (SELECT Y2 FROM T2)
SELECT X1
    FROM T1
    WHERE (T1.X1, T1.Y1) = ANY (SELECT X2,Y2 FROM T2)
SELECT Y1
    FROM T1
    WHERE X1 <= (SELECT AVERAGE (X2) FROM T2)
```

Connecting predicates connect an enclosed query block and its immediate enclosing query block, which are also referred to as the inner and the outer query blocks.

CORRELATING PREDICATES

A correlating predicate exists when an operand used in a subquery predicate references an outer table. The following is a correlating predicate example:

```
SELECT *
    FROM T1, T2
    WHERE T1.X1 = T2.X2 AND T1.Y1 NOT IN (SELECT Y3
        FROM T3, T4 WHERE T2.Z2 < T3.Z3 AND
        T3.X3 = T4.X4)
```

The above example shows the main query and the subquery related by both a connecting predicate (Y1 NOT IN Y3) and a correlating predicate (T2.Z2<T3.Z3) in the subquery which references T2, which is immediately contained in the main query block.

EXISTENTIAL PREDICATES

The operator EXISTS followed by a query forms an existential predicate, which is also known for short as an EXISTS predicate. As with connecting predicates, EXISTS predicates connect an outer block to an inner block. The left operand of EXISTS is a NULL.

The following is an example query with an EXISTS predicate:

```
SELECT *
    FROM T1
    WHERE EXISTS (SELECT * FROM T2 WHERE
        T1.X1 = T2.X2)
```

REGULAR PREDICATES

A regular predicate is one which is not a connecting, correlating, or EXISTS predicate, is regular, and usually appears in a WHERE clause which selects a table subset.

GLOBAL OPTIMIZATION OF JOINS IN SQL QUERIES

Figure 3:
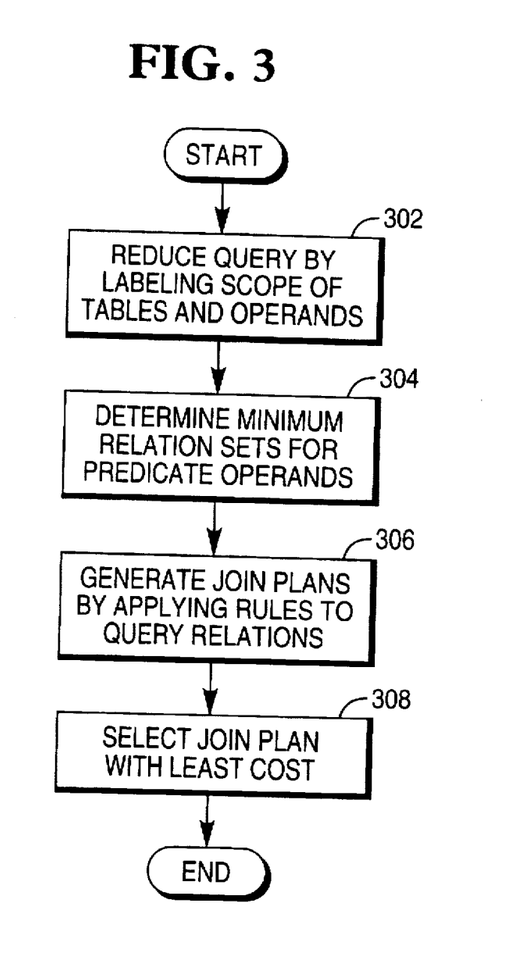
FIG. 3 is a flow diagram illustrating a method of global optimization for joins in queries with subqueries compatible with the present invention.

FIG. 3 describes a preferred method of global optimization for joins in queries with subqueries according to the present invention. The following steps are incorporated in the global optimization method of the present invention:

1. At 302, reduce the query and determine the minimum relation sets for predicate operands at 304.
2. At 306, generate different join plans following predefined rules (described below) to select relations and predicates.
3. At 308, select the join plan with the least cost.

The semantics of a correlated subquery is that each subquery is evaluated once for each outer row, and each result set is used to join back with the outer row using the connecting predicate. Effectively, a connecting predicate is evaluated once for each row in outer table.

According to the method of the present invention, a connecting predicate is evaluated only once. Iteratively evaluating the subquery for each selected row of the outer query is achieved by joining the outer tables and the inner tables of the subquery in an order resulting in a relation which is divided into groups, each of which is associated with one selected row in the outer query. To identify the groups in this resulting relation, a unique identifier is assigned to each outer row and each row of the resulting relation will contain this unique outer row identifier. The groups are identified by these identifiers.

For example, given the following query:

```
SELECT T0.*
    FROM T1, T0
    WHERE T0.X0 IN (SELECT T2.X2 FROM T2 WHERE
        T1.Y1 < T2.Y2)
```

The subquery may be evaluated as follows:

```
TEMP (ID1, X2) = SELECT T1.UNIQUEID, T2.X2 FROM T1, T2
    WHERE T1.Y1 < T2.Y2;
```

The table T0 and the temporary result table TEMP are then typically joined, such that a row from T0 will be returned at most once for each group of rows in TEMP associated with a row from table T1.

If a connecting predicate's subquery specifies an aggregate function, the aggregate must be done on the subquery with the grouping field as the outer row's unique identifier before the connecting condition can be evaluated. For example, given the following query:

```
SELECT T0.*
    FROM T0, T1
    WHERE T0.X0 IN (SELECT MAX (T2.X2) FROM T2 WHERE
        T1.Y1 < T2.Y2)
```

The following join plan may be used to handle the query:

```
TEMP (MAXX2) = SELECT MAX (T2.X2) FROM T1, T2 WHERE
    T1.Y1 < T2.Y2 GROUP BY T1.UNIQUEID
SELECT T0. *
    FROM T0, TEMP
    WHERE T0.X0 = TEMP.MAXX2
```

In the above example, the resulting relation TEMP does not contain the identifiers because it has been "used up" in the aggregate MAX in the subquery. The outer row identifiers are always used in some manner, whether or not they are retained in the temporary relation. The rules to select relations and predicates given below in this specification clearly point out when the identifiers are needed in the resulting relation.

If the left operance of the connecting condition specifies one of the outer table in the subquery result, a predicate will be added to match the outer row unique identifiers and the subquery result. This is illustrated by the following example:

```
SELECT T1.*
    FROM T1
    WHERE T1.X1 IN (SELECT MAX (T2.X2) FROM T2 WHERE
        T1.Y1 < T2.Y2)
```

The above example differs from the previous example in the number of tables immediately contained in the main query. It will be noted that the connecting predicate and the correlating predicate share the same table T1. This fact requires the identifiers to be retained in the resulting relation when the connecting predicate is evaluated and an extra predicate to be internally generated. The rules to select relations and predicates given below in the present specification clearly identify this situation. For this example, the following join plan may be used to handle the query:

```
TEMP (ID1, MAXX2) = SELECT T1.UNIQUEID, MAX (T2.X2)
    FROM T1, T2 WHERE T1.Y1 < T2.Y2 GROUP BY
    T1.UNIQUEID
SELECT T1.*
    FROM T1, TEMP
    WHERE T1.UNIQUEID = TEMP.ID1 AND T1.X1 =
        TEMP.MAXX2
```

The present invention performs a global optimization by converting a complex query into a simple one with a list of tables to be joined and a list of predicates to apply in the joins. T0 be able to generate a join order that efficiently return a correct result, the present invention incorporates the following elements:

— A query reduction method to label the scope of tables and predicate operands, and to determine minimum relation sets for predicate operands and predicate properties. This reduction turns a complex query into a simple one.

— A set of rules to determine the conditions to apply a join to any two relations and which predicates can be used to join them. These rules guarantee the correctness of results generated via the global optimization approach.

QUERY REDUCTION METHOD

Figure 4:
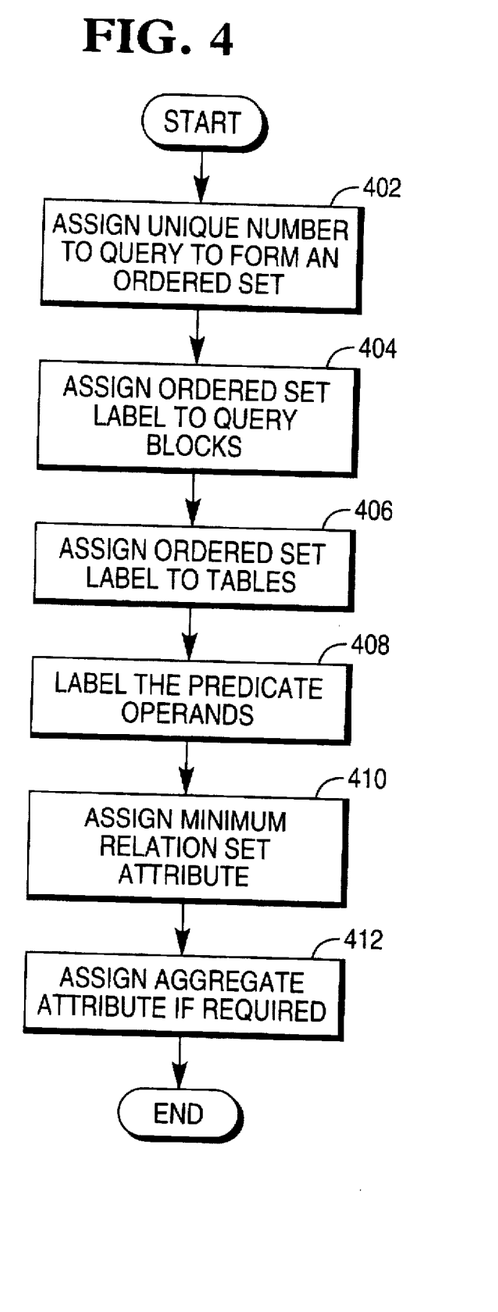
FIG. 4 is a flow diagram illustrating a query reduction method compatible with the present invention.

FIG. 4 describes a preferred query reduction method according to the present invention. The following steps are incorporated in the optimization method of the present invention.

Label Query. At 402, each query is assigned a unique number which is then used to form an ordered set to label query blocks, tables and predicate operands. Ordered sets are represented by an ordered number list inside a pair of curly brackets.

Label Query Block. At 404, each query block is assigned a label comprising an ordered set of query numbers that indicate the enclosing queries and its own unique query number. For example, {1, 3, 5} indicates a query block numbered 5, defined inside a query block numbered 3, defined inside a query block numbered 1 (i.e., the outermost or main query).

Label Table. At 406, each table is assigned a label comprising an ordered set of query numbers that indicate the query block where it is immediately contained. For example label {1, 4} for T indicates that T is immediately contained in query block numbered 4, inside a query block numbered 1.

Label Predicate Operand. At 408, both the left and right operands of a regular predicate or correlating predicate are labeled with the label of the immediate query block where they are specified. For connecting predicates, the left operand is labeled with the label of the outer query block and the right operand is labeled with the label of the inner query block. For EXISTS predicates, the NULL left operand is labeled with the label of the outer query block and the right operand is labeled with the label of the inner query block.

Minimum Relation Set. At 410, the minimum relation set attribute of a connecting predicate operand indicates the set of base tables which must be present in the table list of a relation for it to become a candidate operand for a join operation which uses the predicate as a join condition. If the subquery is correlated, the predicate will also have the minimum relation set of outer tables which must be a subset of the table list of either the left or the right operand of a join operation which uses the predicate as a join condition.

The minimum relation set of the left operand of a connecting predicate is the list of tables used in the operands. The minimum relation set of the right operand of a connecting predicate or an EXISTS predicate is the list of tables immediately contained in the subquery and the nested subqueries of the subquery. The left operand of an EXISTS predicate (a NULL) has an empty minimum relation set and it is needed only for the purpose of labeling.

If a correlated subquery specifies an aggregate function, the minimum relation set of the right operand includes the set of the outer tables. This results because the aggregate function has to be carried out on the subquery result grouped by the combined unique identifier associated with all outer tables in the subquery result before the connecting condition can be used in a join operation. In addition, before the aggregate can be done, join operations with the outer tables using the correlating conditions have to be performed to restrict the set of inner rows that would participate in the aggregate.

The minimum relation set values are used to determine which connecting predicate is to be used in a binary join operation. When a join uses a predicate as a condition, it is said that the join applies to the predicate.

Predicate Properties. At 412, if a subquery specifies an aggregate function, the aggregate function must be performed on the right operand before the connecting predicate can be used in a join operation. An attribute is used to indicate whether an aggregate function exists in the right operand.

When a correlated subquery specifies a COUNT function, and if a row from the outer query has no match in the subquery, a COUNT of zero must be returned for this row. To satisfy this requirement, an outer join operation is used to join an outer table and an inner table. Another attribute is used to indicate that the join applying to a predicate has to be an outer join and which of its operands has to be the outer table. For each outer table referenced in a subquery, if there is a correlating predicate between this table and an inner table, the attribute of this predicate will indicate the outer join requirement; otherwise, if no correlating predicate is specified between this outer table and an inner table, a dummy predicate will be added and its attribute indicates the outer join requirement.

Figure 5:
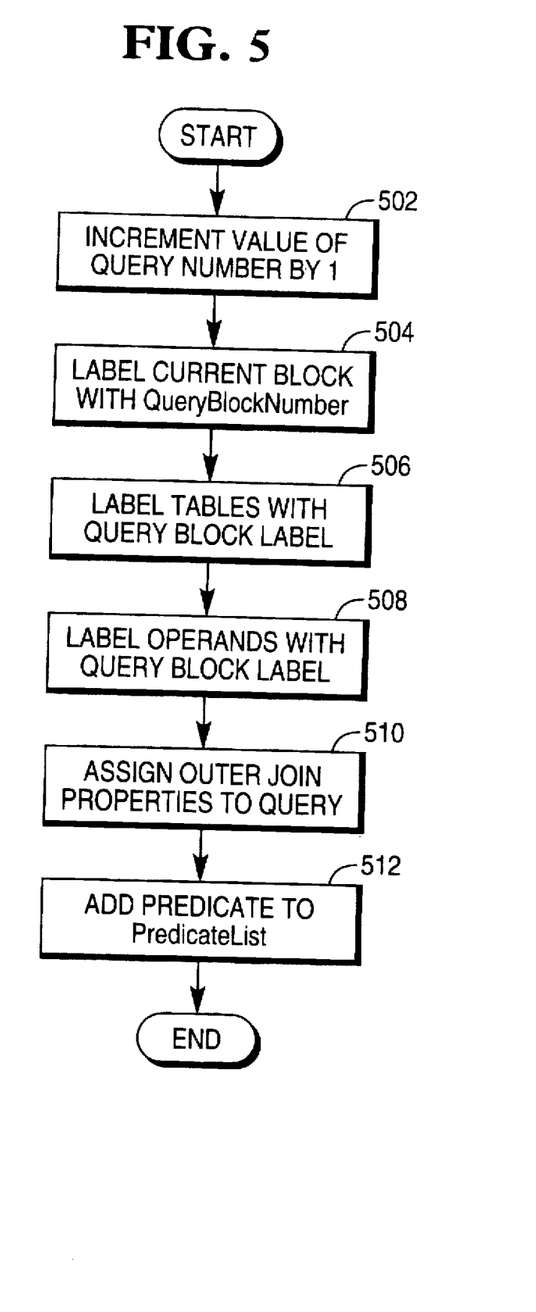
FIG. 5 is a flow diagram describing the steps to reduce a query compatible with the present invention.

Steps to Reduce Query. FIG. 5 describes the preferred steps to reduce a query. The following steps assume that QueryBlockNumber is declared as a set of numbers, RelationList is a set of relations and PredicateList is a list of predicates. It is also assumed that every WHERE condition in the query is already in conjunctive normal form (CNF). The following are the preferred steps to reduce the query according to the present invention:

1. At 502, increment the query number by 1 and add this number to the set identified as QueryBlockNumber.
2. At 504, label the current query block with the set in QueryBlockNumber.
3. At 506, label each table immediately contained in the corresponding query block with the label of the query block and add it to the RelationList.
4. At 508, for each predicate in the CNF predicate list in the block:
   a. Label the left operand with the label of the query block.
   b. If it is neither a connecting nor an EXISTS predicate, then:
      i. Label the right operand with the label of the query block.
   c. Otherwise:
      i. Repeat steps 1 to 4 recursively for the subquery.
      ii. Replace the reference to the subquery with the projection specified in the subquery.
      iii. Label the right operand with the label of the subquery.
      iv. Form the left operand minimum relation set by listing all the tables in the left operand.
      v. Form the right operand minimum relation set with the set of tables immediately contained in this subquery and all its nested subqueries.
      vi. Form the outer table set by listing all outer tables (with respect to this query block) referenced in this subquery and all its nested subqueries.
   d. Assign the aggregate attribute to the predicate.
5. At 510, assign the outer join properties.
6. At 512, add the predicate to the PredicateList.
7. Pop the last number from QueryBlockNumber.

After performing the above-described steps, a complex query with one or more subqueries is reduced to a simple query with a list of tables (RelationList) and a list of predicates (PredicateList). Optimization is then performed on this simple query according to the following set of rules, which are used to determine which relations can be joined together and which predicates can be applied to a particular pair of relations.

RULES TO SELECT RELATIONS AND PREDICATES

Figure 6:
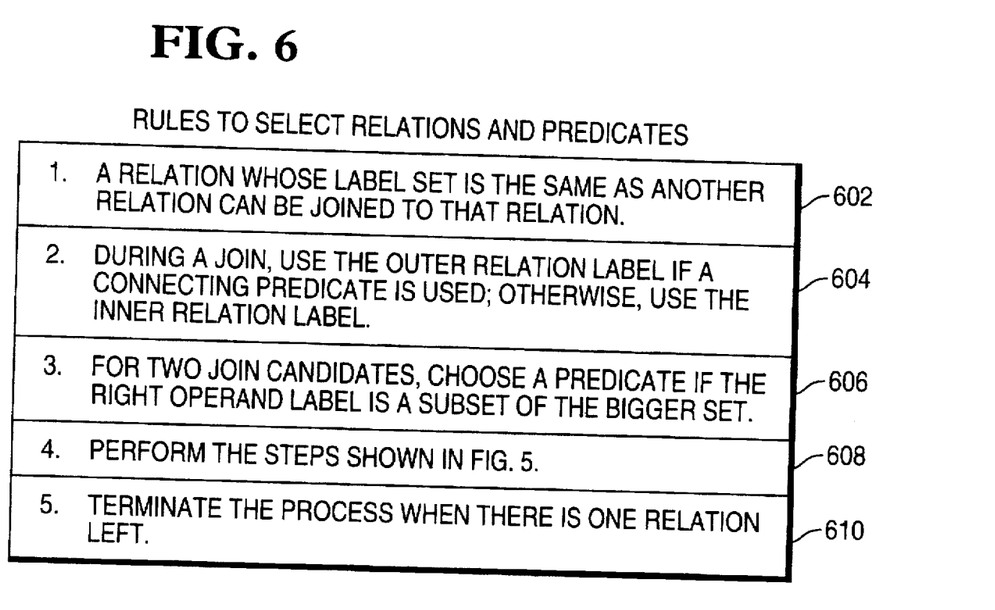
FIG. 6 is a table describing the rules to select relations and predicates compatible with the present invention.

FIG. 6 describes a table of preferred rules to select relations and predicates. The following rules are incorporated in the optimization method of the present invention:

1. At 602, a relation whose label set is the same, or a subset or a superset to the label set of another relation can be joined to that relation. For example, a relation with the label {1, 3} can be joined with a relation with the label {1}, {1, 3} or {1, 3, 7}, but it cannot be joined with one labeled {1, 8}.
2. At 604, when a join operation is performed on two relations, the resulting relation is labeled as follows: if a connecting predicate is used, the resulting relation inherits the label of the outer relation; otherwise, the connecting predicate inherits the label of the inner relation. The table list is the union of the two table lists of the joined relations.

Figure 7A:
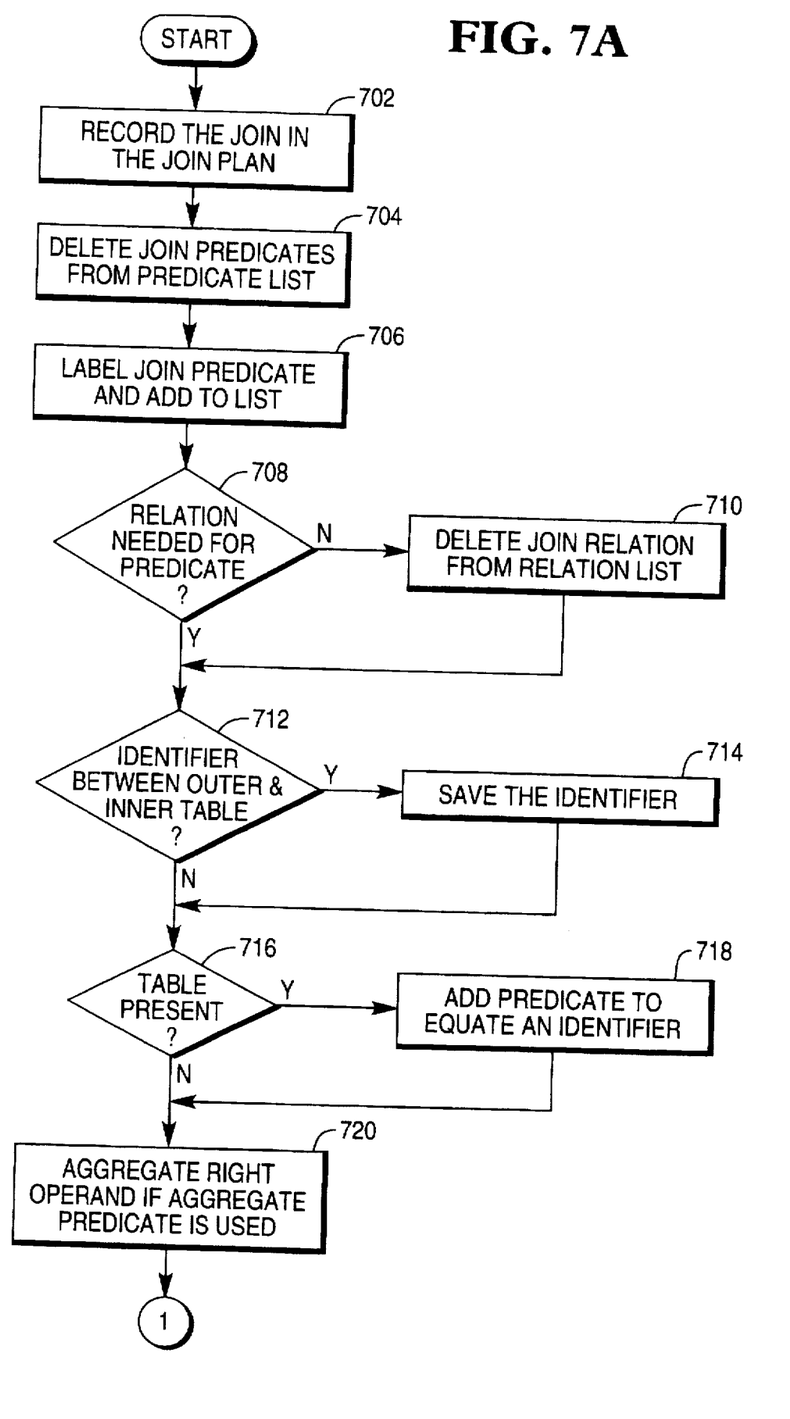
FIGS. 7A and 7B are a flow diagram describing a method of selecting relations and predicates compatible with the present invention.
Figure 7B:
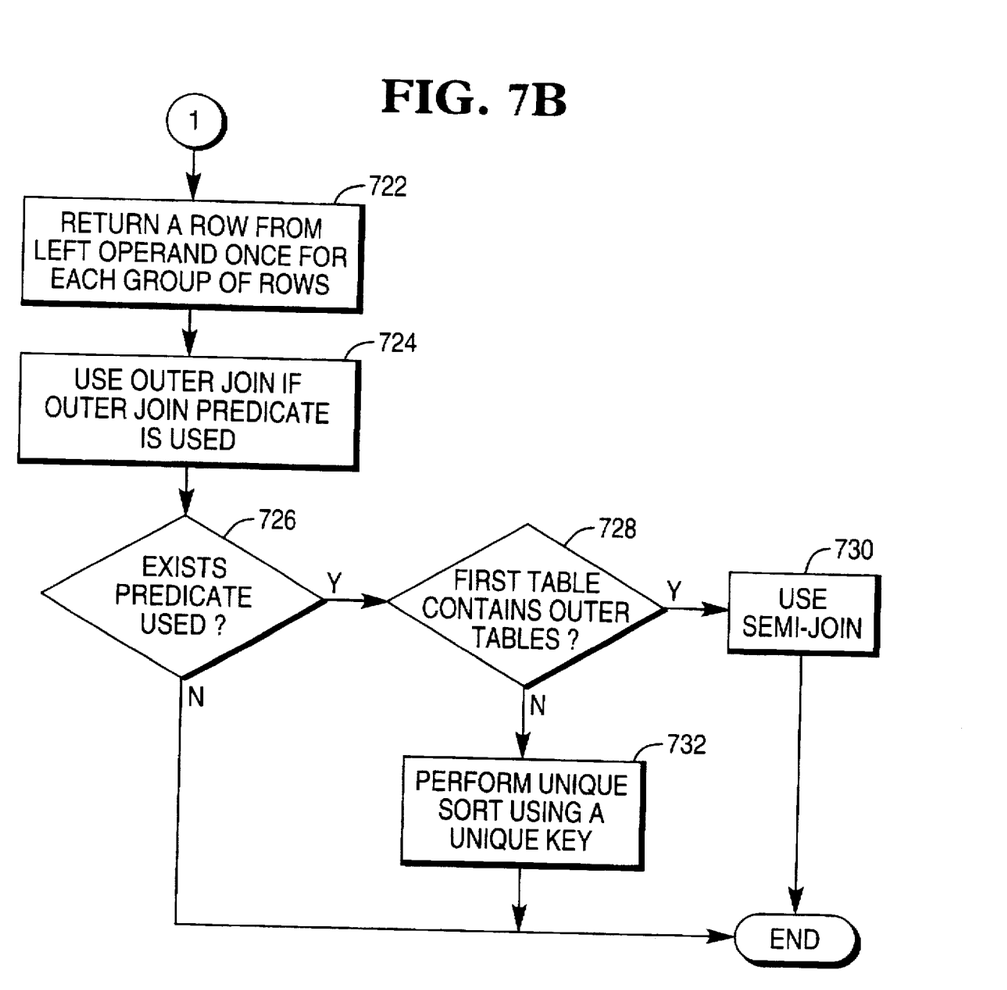

For example, if relation {1} has tables {T1, T2}, {1, 3} has {T2, T3, T4, T5}, {1, 3, 7} has {T6, T7}, then without using any connecting predicate, the result of joining {1} and {1, 3} is labeled {1, 3} with the table list {T1, T2, T3, T4, T5}; {1, 3} and {1, 3, 7}, {1, 3, 7} and the list {T2, T3, T4, T5, T6, T7}. Alternatively, if a connecting condition is used, the result of joining {1} and {1, 3} is labeled {1} with the table list {T1, T2, T3, T4, T5}.
3. At 606, for any two candidates for a join operation, a predicate is chosen to be a join condition if both of the following conditions are satisfied: the right operand label is a subset of the bigger set of either of the two candidates labels; if it is a connecting predicate, the table list of one candidate covers the minimum set for one operand, and the other candidate's table list covers the minimum set for the other operand, and either candidate's table list covers the outer table set. All qualified predicates are chosen and they are all ANDed together.
4. At 608, if a join operation is performed, then perform the following steps as shown in FIGS. 7A and 7B:

a. At 702, record the join in the join plan and add its cost to the plan's cost.
b. At 704, delete all the predicates used in the join from the list of predicates.
c. At 706, label the resulting relation as described in step b above and add it to the list of relations.
d. At 708, if each relation is not needed to cover for any other connecting predicate remaining in the predicate list, then at 710 delete each relation used in the join from the list of relations. A relation cannot be deleted if there is any remaining connecting condition whose left operand has a label that is a subset of the label of the join result and it has this relation in the left operand.
e. At 712, if the unique identifier is between an outer table and an inner table and the connecting condition between them is not used in the join, then at 714 save the unique identifier of the outer table in the join result.
f. At 716, if an outer table is not deleted from the list of relation, then at 718 add a predicate to equate the grouping identifier saved in the join result and that outer row identifier.
g. At 720, aggregate the right operand grouped by the saved outer row identifier if a connecting condition is used and its property indicates aggregate has to be done on the right operand before the join.
h. At 722, if a connecting condition is used and the right operand of the predicate contains an outer table, the join will be done such that a row from the left operand will be returned at most once for each group of rows in the right operand associated with an outer row.
i. At 724, if a predicate is used in the join and its property indicates an outer join is required, or if the join is between an outer join result and some inner table with no connecting condition being applied, the join will be implemented using an outer join.
j. At 726, if the connecting condition used in the join is an EXISTS predicate, process as follows:
   i. At 728, if one join table contains only outer tables and the other join table does not contain any outer table, then at 730 a semi-join will be used that returns each outer row at most once.
   ii. Otherwise, after the join is done, at 732 a unique sort will be done on the join result with the unique key as the unique identifier of all the outer tables.

5. At 610 in FIG. 6, stop processing when there is only one relation left in the relation list. This relation should include all tables contained in the query. If the predicate list is exhausted before the relation list is reduced to one, the remaining relations are product-joined to produce the final result.

CONCLUSION

This concludes the description of the preferred embodiment of the invention. The following paragraph describes an alternative embodiment for accomplishing the same invention.

In one alternative embodiment, any type of computer, [su]ch as a mainframe, minicomputer, or personal computer, could be used to implement the present invention. In addition, any software program adhering (either partially or entirely) to the SQL language could benefit from the present invention.

In summary, the present invention discloses a method, apparatus, and program product for optimizing a query and its subqueries together in a global manner regardless of the nesting levels. All joins in different nesting levels are effectively converted into joins in the same level by assigning a nesting level attribute to relations, assigning properties to the predicate, and assigning nesting level attributes and minimum relation set attributes to join predicate operands. The joins and their predicates are then considered as if they were contained in only the main query according to a set of rules based on the attributes of the relations and the join predicates.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing an SQL query in a computer having a memory, the SQL query being performed by the computer to retrieve data from a relational database stored in one or more electronic storage devices coupled to the computer, the method comprising the steps of:

(a) reducing the query in the memory of the computer by labeling query blocks, relations and predicate operands in the query according to their scope using an ordered set of query block numbers, and by determining minimum relation sets for predicate operands and predicate properties in the query;

(b) generating a plurality of join plans in the memory of the computer by applying a predetermined set of rules to the labels of the query blocks, relations and predicate operands to determine which relations can be joined together and which predicates can be applied to a particular pair of relations; and (c) selecting a join plan in the memory of the computer from the plurality of join plans, wherein the selected join plan has a least performance cost associated therewith.

2. The method as set forth in claim 1 above, wherein the step of reducing further comprises the steps of:

(1) labeling each query block within the query by assigning a label thereto, wherein the label comprises an ordered set of query block numbers for all enclosing query blocks and a unique number assigned to the enclosed query block;

(2) labeling each relation within the query by assigning a label thereto, wherein the label comprises an ordered set of query block numbers for all query blocks immediately containing the relation;

(3) labeling each predicate operand within the query by assigning a label to left and right operands thereof, wherein the label comprises an ordered set of query block numbers for a query block where the left and right operands are specified;

(4) assigning a minimum relation set to the left and right operands of each predicate operand, wherein the minimum relation set comprises a set of base tables that must be present in the table list of a relation referenced by the predicate operand; and (5) assigning an aggregate attribute to the right operand of each predicate operand that specifies an aggregate function.

3. The method as set forth in claim 1 above, wherein the step of generating comprises the step of joining a first relation to a second relation where the first relation's label is identical to the second relation's label.

4. The method as set forth in claim 1 above, wherein the step of generating comprises the step of joining a first relation to a second relation where the first relation's label is subset of the second relation's label.

5. The method as set forth in claim 1 above, wherein the step of generating comprises the step of joining a first relation to a second relation where the first relation's label is superset of the second relation's label.

6. The method as set forth in claim 1 above, wherein the step of generating comprises the steps of labeling a joined relation with an outer relation's label when connecting predicate is used, and labeling a joined relation with an inner relation's label when connecting predicate is not used.

7. An apparatus for optimizing an SQL query, comprising:
   (a) a computer having a memory and one or more electronic storage devices coupled thereto, the data storage devices storing a relational database;
   (b) means, performed by the computer, for accepting the SQL query into the memory of the computer, the SQL query being performed by the computer to retrieve data from a relational database stored in the electronic storage devices;
   (c) means, performed by the computer, for reducing the query in the memory of the computer by labeling query blocks, relations and predicate operands in the query according to their scope using an ordered set of query block numbers, and by determining minimum relation sets for predicate operands and predicate properties in the query;
   (d) means, performed by the computer, for generating a plurality of join plans in the memory of the computer by applying a predetermined set of rules to the labels of the query blocks, relations and predicate operands to determine which relations can be joined together and which predicates can be applied to a particular pair of relations; and
   (e) means, performed by the computer, for selecting a join plan in the memory of the computer from the plurality of join plans, wherein the selected join plan has a least performance cost associated therewith.

8. The apparatus as set forth in claim 7 above, wherein the means for reducing further comprises:
   (1) means for labeling each query block within the query by assigning a label thereto, wherein the label comprises an ordered set of query block numbers for all enclosing query blocks and a unique number assigned to the enclosed query block;
   (2) means for labeling each relation within the query by assigning a label thereto, wherein the label comprises an ordered set of query block numbers for all query blocks immediately containing the relation;
   (3) means for labeling each predicate operand within the query by assigning a label to left and right operands thereof, wherein the label comprises an ordered set of query block numbers for a query block where the left and right operands are specified;
   (4) means for assigning a minimum relation set to the left and right operands of each predicate operand, wherein the minimum relation set comprises a set of base tables that must be present in the table list of a relation referenced by the predicate operand; and
   (5) means for assigning an aggregate attribute to the right operand of each predicate operand that specifies an aggregate function.

9. The apparatus as set forth in claim 7 above, wherein the means for generating comprises means for joining a first relation to a second relation where the first relation's label is identical to the second relation's label.

10. The apparatus as set forth in claim 7 above, wherein the means for generating comprises means for joining a first relation to a second relation where the first relation's label is subset of the second relation's label.

11. The apparatus as set forth in claim 7 above, wherein the means for generating comprises means for joining a first relation to a second relation where the first relation's label is superset of the second relation's label.

12. The apparatus as set forth in claim 7 above, wherein the means for generating comprises means for labeling a joined relation with an outer relation's label when connecting predicate is used, and labeling a joined relation with an inner relation's label when connecting predicate is not used.

13. A program storage device, readable by a computer, tangibly embodying a program of instructions executable by the computer to perform method steps for executing an SQL query in a computer having a memory, the SQL query being performed by the computer to retrieve data from a relational database stored in one or more electronic storage devices coupled to the computer, the method comprising the steps of:
   (a) reducing the query in the memory of the computer by labeling query blocks, relations and predicate operands in the query according to their scope using an ordered set of query block numbers, and by determining minimum relation sets for predicate operands and predicate properties in the query;
   (b) generating a plurality of join plans in the memory of the computer by applying a predetermined set of rules to the labels of the query blocks, relations and predicate operands to determine which relations can be joined together and which predicates can be applied to a particular pair of relations; and
   (c) selecting a join plan in the memory of the computer from the plurality of join plans, wherein the selected join plan has a least performance cost associated therewith.

14. The program storage device as set forth in claim 13 above, wherein the step of reducing further comprises the steps of:
   (1) labeling each query block within the query by assigning a label thereto, wherein the label comprises an ordered set of query block numbers for all enclosing query blocks and a unique number assigned to the enclosed query block;
   (2) labeling each relation within the query by assigning a label thereto, wherein the label comprises an ordered set of query block numbers for all query blocks immediately containing the relation;
   (3) labeling each predicate operand within the query by assigning a label to left and right operands thereof, wherein the label comprises an ordered set of query block numbers for a query block where the left and right operands are specified;
   (4) assigning a minimum relation set to the left and right operands of each predicate operand, wherein the minimum relation set comprises a set of base tables that must be present in the table list of a relation referenced by the predicate operand; and
   (5) assigning an aggregate attribute to the right operand of each predicate operand that specifies an aggregate function.

15. The program storage device as set forth in claim 13 above, wherein the step of generating comprises the step of joining a first relation to a second relation where the first relation's label is identical to the second relation's label.

16. The program storage device as set forth in claim 13 above, wherein the step of generating comprises the step of joining a first relation to a second relation where the first relation's label is subset of the second relation's label.

17. The program storage device as set forth in claim 13 above, wherein the step of generating comprises the step of joining a first relation to a second relation where the first relation's label is superset of the second relation's label.

18. The program storage device as set forth in claim 13 above, wherein the step of generating comprises the steps of labeling a joined relation with an outer relation's label when connecting predicate is used, and labeling a joined relation with an inner relation's label when connecting predicate is not used.

* * * * *